US012773875B2

(12) United States Patent
Burris et al.

(10) Patent No.: US 12,773,875 B2
(45) Date of Patent: Oct. 27, 2026

(54) WHEEL HUB WITH PASSAGEWAY

(71) Applicant: Consolidated Metco, Inc., Vancouver, WA (US)

(72) Inventors: Jared Wiley Richard Burris, Ridgefield, WA (US); Richard T. Caminari, Vancouver, WA (US); Randy P. Smith, Clackamas, OR (US); Jonathan Roy Elkin, Camas, WA (US); Timothy James Reddington, II, Parrish, FL (US); Noah Augustine, Waxhaw, NC (US); Michael E. Johnson, Scappoose, OR (US); Michael S. Bohna, Hillsboro, OR (US); Gavin Leisek, Vancouver, WA (US); Caleb Thomas Creason, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 353 days.

(21) Appl. No.: 18/235,552

(22) Filed: Aug. 18, 2023

(65) Prior Publication Data

US 2024/0059097 A1 Feb. 22, 2024

Related U.S. Application Data

(60) Provisional application No. 63/399,374, filed on Aug. 19, 2022.

(51) Int. Cl.
*B60B 27/02* (2006.01)
*B60B 27/00* (2006.01)

(52) U.S. Cl.
CPC .......... *B60B 27/02* (2013.01); *B60B 27/0005* (2013.01); *B60B 2310/202* (2013.01)

(58) Field of Classification Search
CPC ..... B60B 27/00; B60B 27/02; B60B 27/0005; B60B 2310/202; B60C 23/00; B60C 23/00318

(Continued)

(56) References Cited

U.S. PATENT DOCUMENTS 2,944,579 A * 7/1960 Kamm .............. B60C 23/00372 152/416
4,582,107 A * 4/1986 Scully ............... B60C 23/00363 152/417

(Continued)

FOREIGN PATENT DOCUMENTS

CN 113320338 A * 8/2021 ........... B60C 23/001
EP 0521719 A1 1/1993

(Continued)

OTHER PUBLICATIONS

International Search Report and Written Opinion from related International Patent Application No. PCT/US2023/030568 dated Feb. 8, 2024; 21 pages.

(Continued)

*Primary Examiner* — S. Joseph Morano
*Assistant Examiner* — Eva L Comino
(74) *Attorney, Agent, or Firm* — Fitch, Even, Tabin & Flannery LLP

(57) ABSTRACT

In one aspect of the present disclosure, a wheel hub is provided that includes a wheel hub body having an inboard end and an outboard end. The wheel hub body has a wheel mounting portion, such as a flange, intermediate the inboard and outboard ends. The wheel hub body has a central opening, an interior surface extending about the central opening, and an exterior surface opposite the interior surface. The wheel hub includes a passageway having an interior port at the interior surface of the wheel hub body and (Continued)

an exterior port at the exterior surface of the wheel hub body. The interior port is outboard of the inboard end of the wheel hub body. The exterior port is intermediate the wheel mounting portion and the outboard end of the wheel hub body.

28 Claims, 15 Drawing Sheets

(58) Field of Classification Search
USPC ........................................................ 301/105.1
See application file for complete search history.

(56) References Cited

U.S. PATENT DOCUMENTS

| | | | | | |
|---|---|---|---|---|---|
| 4,678,017 | A | | 7/1987 | Schultz | |
| 4,696,334 | A | | 9/1987 | le Chatelier | |
| 4,705,090 | A | * | 11/1987 | Bartos | B60C 23/00336 137/224 |
| 4,733,707 | A | | 3/1988 | Goodell | |
| 4,804,027 | A | * | 2/1989 | Runels | B60C 23/00345 152/417 |
| 5,287,906 | A | | 2/1994 | Stech | |
| 5,377,736 | A | | 1/1995 | Stech | |
| 5,503,480 | A | | 4/1996 | Caillaut | |
| 5,538,062 | A | | 7/1996 | Stech | |
| 5,584,949 | A | | 12/1996 | Ingram | |
| 5,797,398 | A | | 8/1998 | Bowman | |
| 5,797,979 | A | | 8/1998 | Quinn | |
| 5,868,881 | A | * | 2/1999 | Bradley | B60C 23/00318 152/417 |
| 6,269,691 | B1 | | 8/2001 | Sowatzke | |
| 6,435,238 | B1 | | 8/2002 | Hennig | |
| 6,698,482 | B2 | | 3/2004 | Hennig | |
| 6,892,778 | B2 | | 5/2005 | Hennig | |
| 7,931,061 | B2 | * | 4/2011 | Gonska | B60C 23/00318 152/417 |
| 8,616,254 | B2 | | 12/2013 | Kelley | |
| 8,915,274 | B2 | * | 12/2014 | Eschenburg | B60C 23/00363 152/416 |
| 9,221,395 | B2 | | 12/2015 | Honig | |
| 9,718,319 | B2 | * | 8/2017 | Knepple | B60C 29/002 |
| 11,254,170 | B2 | * | 2/2022 | Furtado | B60B 27/0073 |
| 11,476,709 | B2 | | 10/2022 | Seibert | |
| 2002/0112802 | A1 | * | 8/2002 | D'Amico | B60C 23/0039 152/415 |
| 2009/0284362 | A1 | | 11/2009 | Wilson | |
| 2010/0181739 | A1 | * | 7/2010 | Eschenburg | B60C 23/00318 280/124.125 |
| 2015/0068653 | A1 | * | 3/2015 | Cis | B60C 23/00363 152/417 |
| 2015/0231937 | A1 | | 8/2015 | Höldrich | |
| 2015/0290986 | A1 | * | 10/2015 | Tsiberidis | F16J 15/002 152/417 |
| 2015/0352911 | A1 | * | 12/2015 | Bittlingmaier | B60B 27/0047 152/417 |
| 2020/0161898 | A1 | * | 5/2020 | Seibert | H02J 50/80 |
| 2020/0386316 | A1 | | 12/2020 | Richards | |
| 2022/0048318 | A1 | * | 2/2022 | Shah | F16C 19/548 |
| 2024/0059106 | A1 | | 2/2024 | Caminari | |

FOREIGN PATENT DOCUMENTS

| | | | |
|---|---|---|---|
| EP | 1186451 | A2 | 3/2002 |
| EP | 2196335 | A2 | 6/2010 |
| EP | 3170678 | A1 | 5/2017 |
| WO | 2014044259 | A1 | 3/2014 |
| WO | 2015195028 | A1 | 12/2015 |
| WO | 2017070325 | A1 | 4/2017 |

OTHER PUBLICATIONS

Invitation to Pay Additional Fees from related International Patent Application No. PCT/US2023/030568 dated Oct. 19, 2023; 3 pages.
Meritor Tire Inflation System (MTIS™) with ThermALERT™; YouTube video https://www.youtube.com/watch?v=97T9ZbYD96s; published Sep. 7, 2022; disclosing screen captures; 10 pages.
Meritor® Tire Inflation Systems (MTIS) with ThermALERT™ Standard product brochure; Meritor Heavy Vehicle Systems, LLC; © 2018 Meritor, Inc., Revised Aug. 2018 (47865/70906); 14 pages.
P.S.I. ATIS product brochure; Pressure Systems International, Inc.; © 2022, S001-01 12-22; believed to be publicly available before Aug. 19, 2022; 4 pages.
Product Catalog: Halo Tire Inflator™ and Halo Connect, Part No. 90-00004917, Revision R06, Oct. 1, 2019; Aperia Technologies, Inc., 14 pages.
PSI Commercial ATIS TPMS Telematics; YouTube video https://www.youtube.com/watch?v=8iENoWVGXVQ; published Oct. 22, 2022; disclosing screen captures and audio transcription; 8 pages.
Spicer® Central Tire Inflation System (CTIS) product brochure; Dana Off-Highway Driveline Technologies; © Dana Limited OHSCTIS-102011, believed to be publicly available before Aug. 19, 2022; 4 pages.
Tireboss™ Tire Pressure Control Technology Over; YouTube video https://www.youtube.com/watch?v=59XPvJZrlcM; published Oct. 15, 2015; disclosing screen captures and audio transcription; 24 pages.
Tiremaax® Tire pressure control systems; product brochure; Hendrickson USA, LLC; L1313 Rev A Mar. 2022; 8 pages.
Tiremaaxx® Pro sales brochure; Hendrickson USA, LLC; ; L1199 Rev D Mar. 2019; 6 pages.
Turcon® Roto L, Central Tire Inflation Sealing Systems product brochure; Trelleborg Sealing Solutions; believed to be publicly available before Aug. 19, 2022; 2 pages.
Extended European Search Report from related European Patent Application No. 23855496.8 dated Jul. 16, 2026; 8 pages.

* cited by examiner

WHEEL HUB WITH PASSAGEWAY

CROSS-REFERENCE TO RELATED APPLICATION

This application claims the benefit of U.S. Provisional Application No. 63/399,374, filed Aug. 19, 2022, which is hereby incorporated herein by reference in its entirety.

FIELD

This disclosure relates to wheel hubs for commercial vehicles and, more specifically, to wheel hubs that facilitate the use of wheel end devices such as tire inflation systems.

BACKGROUND

Commercial vehicles often have drive wheel hubs that are mounted to a spindle of the vehicle. The vehicle has an axle shaft extending in the wheel hub and the spindle. The axle shaft has a drive flange that is secured to the wheel hub via axle studs of the wheel hub and nuts that are threaded onto the axle studs. The wheel hub has a flange with studs that secure a wheel to the wheel hub. Rotation of the axle shaft causes rotation of the wheel hub and wheel mounted thereto.

Drivers and/or technicians frequently check the tire pressure of wheels of commercial vehicles to ensure the tire pressure is at or above a predetermined level to maximize the life of the tires. There are various automatic tire inflation systems on the market that permit compressed air to be passed from a compressed air source in the vehicle, such as an air compressor and a tank, to a tire of the vehicle.

One prior automatic tire pressure system utilized a first compressed air conduit that extends through an interior of a spindle. The system has a small rotary air seal near the end of the spindle that permits pressurized air to travel from the first conduit in the interior of the spindle, to a second pressurized air conduit carried on a wheel associated with the spindle, and ultimately to a tire of the wheel. The automatic tire inflation system constantly applies air to the tire at a specific set pressure to keep the tire pressure above a minimum tire pressure. The automatic tire inflation system is unsuitable for drive wheels of commercial vehicles due to the axle shaft extending in the spindle and the drive flange of the axle shaft secured to the outboard end of the drive wheel hub.

One prior approach for providing compressed air to a tire associated with a drive wheel hub utilizes drilling a first hole in a radially inner surface of the drive wheel hub. The approach further includes drilling a second hole in an outboard end surface of an axle stud boss of the drive wheel such that the second hole intersects the first hole. The approach further includes assembling a hollow axle stud in the second hole in the axle stud boss. Compressed air may flow from the radially inner surface of the wheel hub, through the first hole, through the second hole, and through the interior of the hollow axle stud before being directed to the tire.

Using two intersecting drill holes involves potentially difficult drilling operations. For example, the angle of the first hole is limited by the ability of the drill bit to be advanced into the interior of the wheel hub. Another difficulty exists in accurately drilling the first hole in the curved radially inner surface of the wheel hub. Further, drilling two intersecting holes through different portions of the wheel hub and ensuring that the drilled holes intersect cleanly may be difficult, especially when mass producing the wheel hub.

SUMMARY

In one aspect of the present disclosure, a wheel hub is provided that includes a wheel hub body having an inboard end and an outboard end. The wheel hub body has a wheel mounting portion, such as a flange, intermediate the inboard and outboard ends. The wheel hub body has a central opening, an interior surface extending about the central opening, and an exterior surface opposite the interior surface. The wheel hub includes a passageway having an interior port at the interior surface of the wheel hub body and an exterior port at the exterior surface of the wheel hub body. The interior port is outboard of the inboard end of the wheel hub body. The exterior port is intermediate the wheel mounting portion and the outboard end of the wheel hub body. In this manner, a wheel end fluid and/or component, such as compressed air or a wire, may be advanced through the wheel hub from inboard of the wheel, around the wheel mounting portion, and to an outboard side of the wheel.

The present disclosure also provides a wheel hub including a unitary, one-piece wheel hub body and a passageway that permits pressurized air to travel through the wheel hub body. The passageway includes a through opening in the wheel hub body and a tube in the through opening. The tube has open end portions and an interior that permit pressurized air to travel through the tube. The wheel hub body may be formed by casting, with the tube establishing at least a portion of the passageway during casting to facilitate manufacture of the wheel hub.

In another aspect, a method of manufacturing a wheel hub is provided. The method includes casting a wheel hub casting having a central opening and a sidewall extending about the central opening. The casting operation includes forming a partial passageway in the sidewall of the wheel hub casting. The method further includes forming an opening in the sidewall to complete the passageway. Because the casting operation includes forming the partial passageway in the sidewall, the entire passageway does not need to be formed using intersecting drilled holes as in some prior approaches. For example, the partial passageway may open to a curved interior surface of the wheel hub casting. The partial passageway formed during casting avoids having to drill an opening in the curved interior surface, which may be difficult due to the curved surface and the interior diameter of the wheel hub casting.

The present disclosure also provides a method of manufacturing a wheel hub. The method includes positioning a shell core in a cavity of a mold, the shell core having a body and a tube protruding from the body. The method further includes advancing casting material into the cavity of the mold and permitting the casting material to harden to form a wheel hub casting in the cavity of the mold about the shell core. The wheel hub casting includes at least a portion of the tube in a sidewall of the wheel hub casting. Casting the wheel hub casting about the tube permits the tube to establish at least a portion of a conduit for compressed air, wires, etc. in the wheel hub casting.

In another aspect of the present disclosure, a wheel hub is provided that includes a wheel hub body and a wheel mounting portion to receive a wheel. The wheel hub comprises a passageway including an exterior port of the wheel hub body and an interior port of the wheel hub body. The wheel hub body further includes a protector configured to inhibit the wheel from contacting the exterior port. For example, the wheel hub body may have a barrel portion outboard of the wheel mounting portion. To mount a wheel to the wheel hub, the wheel is moved inboard along the barrel portion and connected to the wheel mounting portion. Conversely, the wheel is disconnected from the wheel mounting portion and moved in an outboard direction along the barrel portion. The process of mounting or removing the wheel may involve a center flange of the wheel resting on, impacting, and/or sliding along the wheel hub as a user moves the wheel relative to the wheel hub. The protector may absorb contact from the center flange of the wheel rather than the center flange damaging the exterior port or a component connected thereto, such as a fitting and/or tubing. In one embodiment, the wheel hub body has a unitary, one-piece construction and the protector comprises one or more protrusions such as axle stud bosses of the wheel hub body.

DETAILED DESCRIPTION

Figure 1:
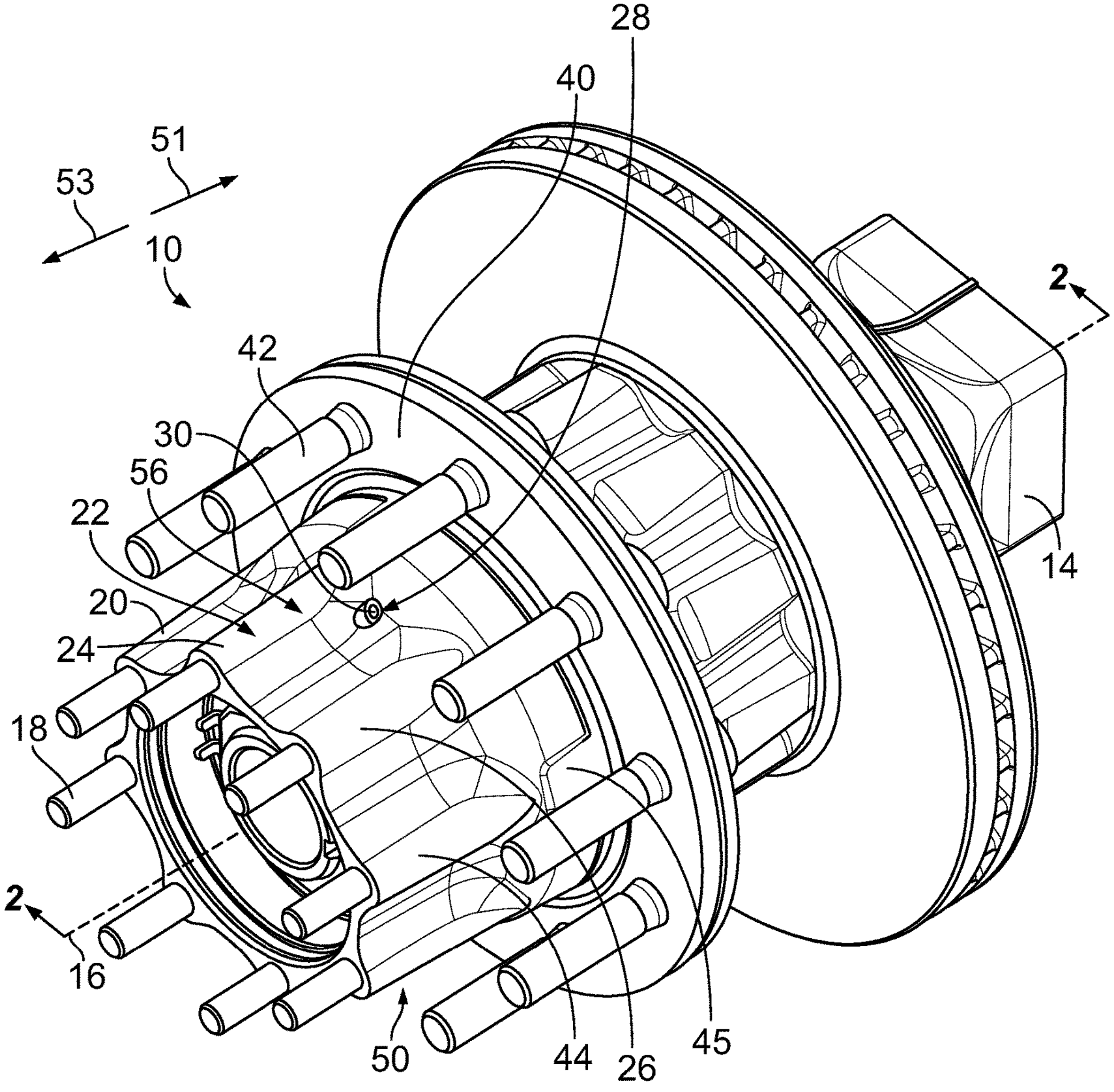
FIG. 1 is a perspective view of a wheel end assembly including a wheel hub mounted to a spindle and a brake rotor secured to the wheel hub.
Figure 2:
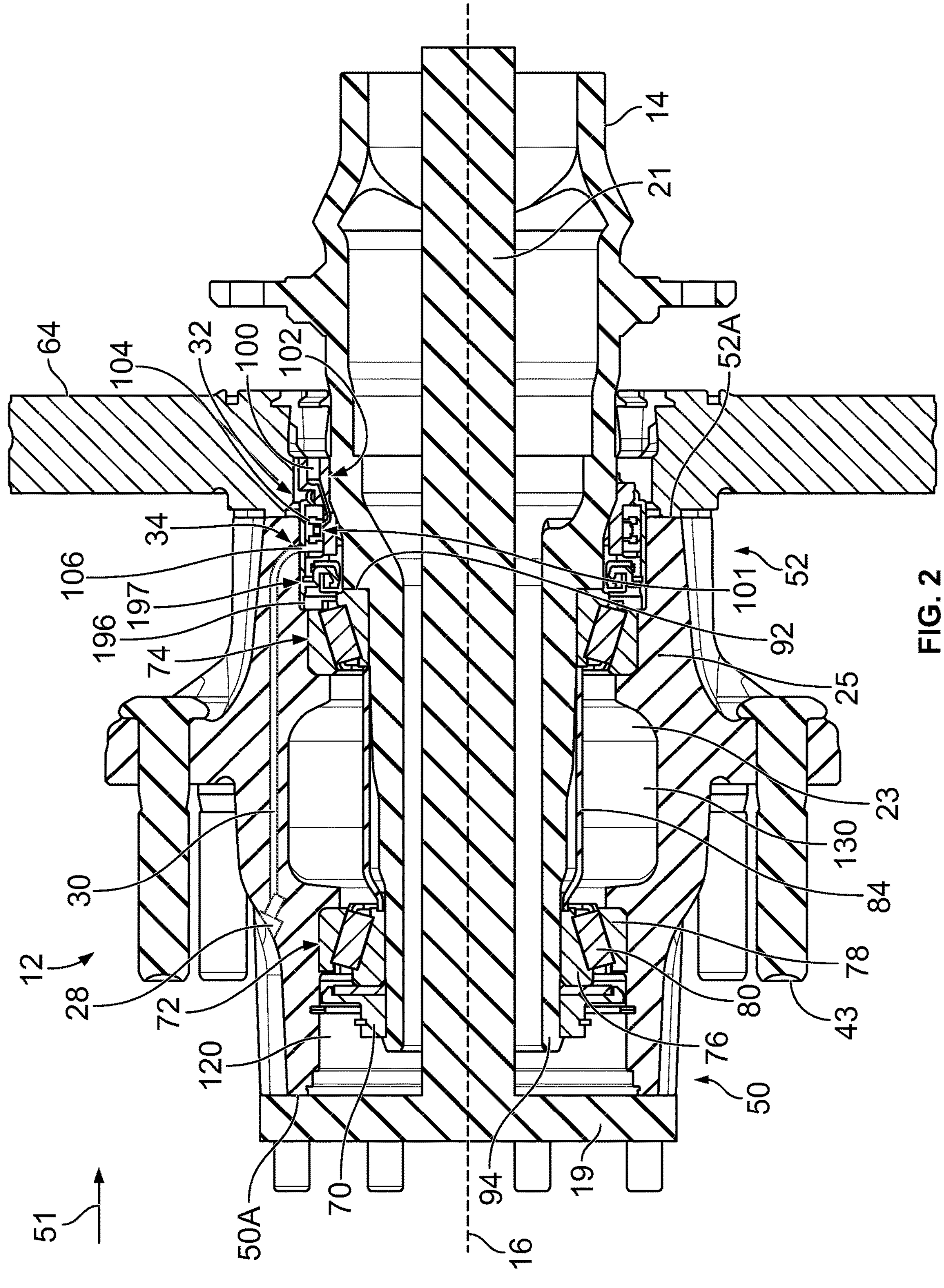
FIG. 2 is a cross-sectional view taken across line 2-2 in FIG. 1 showing a wheel hub body and a pressurized air rotary union of the wheel hub, the wheel hub body having a passageway to receive pressurized air from the pressurized air rotary union.

With reference to FIG. 1, a wheel end assembly 10 is provided for a commercial vehicle. The wheel end assembly 10 includes a wheel hub 12 mounted to a spindle 14 and rotatable about a central axis 16. The wheel hub 12 includes axle studs 18 for receiving a drive flange 19 of a half-shaft 21 (see FIG. 2) that drives the wheel hub 12 about the axis 16. The wheel hub 12 includes a wheel hub body 20 having axle stud bosses 22, such as bosses 24, 26 and an exterior port 28 of a passageway 30 positioned therebetween. With reference to FIG. 2, the passageway 30 has an inlet port such as interior port 34 at a radially inner surface of the wheel hub body 20. The passageway 30 provides a conduit for, for example, compressed air or electrical wiring to be directed from the interior port 34 to the exterior port 28.

Regarding FIG. 2, the wheel hub body 20 has a central opening 23 that receives spindle 14 and internal components of the wheel hub 12 and an annular wall 25 extending around the central opening 23. The wheel hub body 20 has an outboard end portion 50 with the axle studs 18 projecting therefrom for connecting to the drive flange 19. The outboard end portion 50 has an outboard end 50A against which the drive flange 19 seats. The wheel hub body 20 has an inboard end portion 52 to which a circular brake element, such as a brake rotor 64 is mounted. The inboard end portion 52 has an inboard end 52A against which the brake rotor 64 seats. Because the interior port 34 is outboard of the inboard end 52A, and the exterior port 28 is inboard of the outboard end 50A, the passageway 30 provides a conduit for compressed air, wire, etc. without interference from the drive flange 19 and the brake rotor 64.

The wheel end assembly 10 includes a cartridge, such as a rotary union 32, for transferring pressurized air to the passageway 30 when the vehicle is stopped or in motion. The rotary union 32 includes a pressurized air receiver 102 mounted to the spindle 14 and a pressurized air distributor

104 mounted to the wheel hub body 20. The pressurized air distributor 104 rotates about the pressurized air receiver 102 during rotation of the wheel hub body 20. The rotary union 32 facilitates airflow between the non-rotatable pressurized air receiver 102 and the rotatable pressurized air distributor 104. More specifically, the pressurized air receiver 102 has a compressed air inlet 100 that receives pressurized air from a pressurized air source of the vehicle, such as a compressor reservoir. Application of pressurized air at the pressurized air inlet 100 causes a seal 101 of the rotary union 32 to engage and form an airtight seal between the pressurized air receiver 102 and the pressurized air distributor 104. Pressurized air may thereby travel from the pressurized air inlet 100, through the engaged seal 101, out from the outlet 106, and into the passageway 30. The pressurized air may travel from the passageway 30 to a tire associated with the wheel hub body 20. For example, a one-way valve may be threadingly engaged with the exterior port 28 and configured to direct compressed air into a conduit that leads to the tire.

Returning to FIG. 1, the wheel hub body 20 includes a mounting portion, such as a mounting flange 40, for receiving a wheel. In one embodiment, the wheel hub 12 includes studs 42 of the mounting flange 40 that are positioned to receive openings of a central flange of a wheel. The wheel hub body 20 has a barrel 44 and a pilot 45 of the wheel hub body 20 that centers an opening of the central flange of the wheel as the wheel is mounted to the wheel hub 12 in inboard direction 51 or is removed from the wheel hub 12 in outboard direction 53.

The wheel hub body 20 has a protector 56 formed at least in part by the bosses 24, 26 that inhibits the central flange of the wheel from contacting the exterior port 28 or a wheel end component, such as a valve, fitting, or tube, mounted to the exterior port 28. Because the central flange of the wheel is kept away from the exterior port 28, the component mounted to the exterior port 28 is less likely to be damaged during installation and removal of the wheel from the wheel hub 12. For example, as the wheel center flange is advanced along the barrel 44 in the inboard direction 51 during mounting of the wheel to the wheel hub 12, a radially inner edge of the wheel center flange may be supported on the bosses 24, 26 radially outward from the exterior port 28. Further, the wheel studs 42 have ends 43 that are outboard of the exterior port 28. The wheel stud ends 43 extend in holes of the wheel central flange and help center the wheel central flange on the wheel hub body 20 when the wheel central flange is proximate the exterior port 28.

With reference to FIG. 2, the wheel hub 12 includes a spindle lock nut 70 for engaging the spindle 14 and securing the wheel hub 12 to the spindle 14. The wheel hub 12 further includes outboard and inboard bearings 72, 74 that each include a cone 76, a cup 78, and bearing elements, such as tapered rollers 80, that roll along races of the cone and cup 76, 78 to facilitate rotation of the wheel hub body 20 around the axis 16. The wheel hub 12 has a spacer 84 that maintains a fixed axial distance between the cones 76 of the outboard and inboard bearing assemblies 72, 74.

To assemble the wheel hub 12 onto the spindle 14, the wheel hub body 20 including the outboard and inboard bearing assemblies 72, 74, spacer 84, and rotary union 32 mounted therein are advanced in an inboard direction 51 onto the spindle 14. The cone 76 of the inboard bearing assembly 74 seats against a shoulder surface 92 of the spindle 14 and the spindle lock nut 70 is connected to an outboard end portion 94 of the spindle 14, such as via a threaded connection. The spindle lock nut 70 nut may include a retainer to inhibit unintentional loosening of the spindle lock nut 70 from the spindle 14. Because the passageway 30 is formed in the annular wall 25 and the rotary union 32 is mounted to the wheel hub body 20, the wheel hub 12 provides a readily installed conduit for pressurized air from a non-rotatable pressurized air source on the vehicle to a tire mounted to the wheel hub 20.

Figure 3:
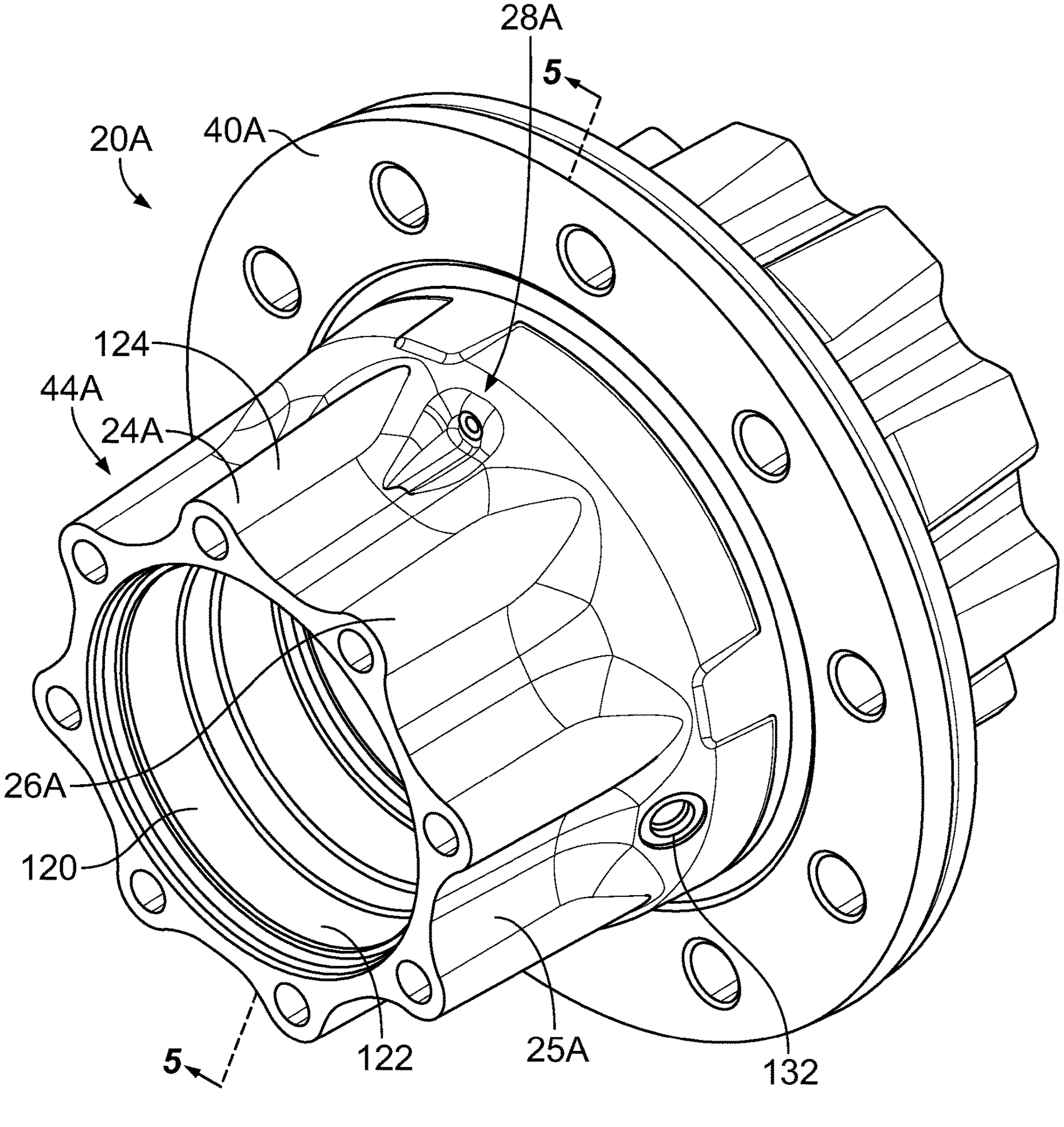
FIG. 3 is a perspective view of another wheel hub body showing an exterior port of the passageway of the wheel hub.

Regarding FIG. 3, a wheel hub body 20A is provided that is similar in many respects to the wheel hub body 20 and may be used in place of the wheel hub body 20 in the wheel hub 12. Thus, similar structures of the wheel hub bodies 20, 20A will be referred to with similar reference numerals, with the letter “A” added to the reference numbers to refer to the structure in the wheel hub body 20A. It will be appreciated that the following description of various structures of the wheel hub body 20A will be applicable to the corresponding structures of the wheel hub body 20.

The wheel hub body 20A has an exterior port 28A and axle stud bosses 24A, 26A on opposite sides thereof. The wheel hub body 20A includes an interior 120 having a radially inner surface 122 with various surface portions to accommodate the internal components of the wheel hub 12 such as the outboard and inboard bearings 72, 74. The wheel hub body 20 includes an exterior 124 that is exposed to the wheel end surrounding environment. The wheel hub body 20A has a sidewall 25A and a lubricant fill opening 132 formed therein that opens to a grease pocket (see grease pocket 130 in FIG. 2) of the interior 120 of the wheel hub body 20A. The lubricant fill opening may be closed by a fill plug that is threadingly engaged with the opening 132.

Figure 4:
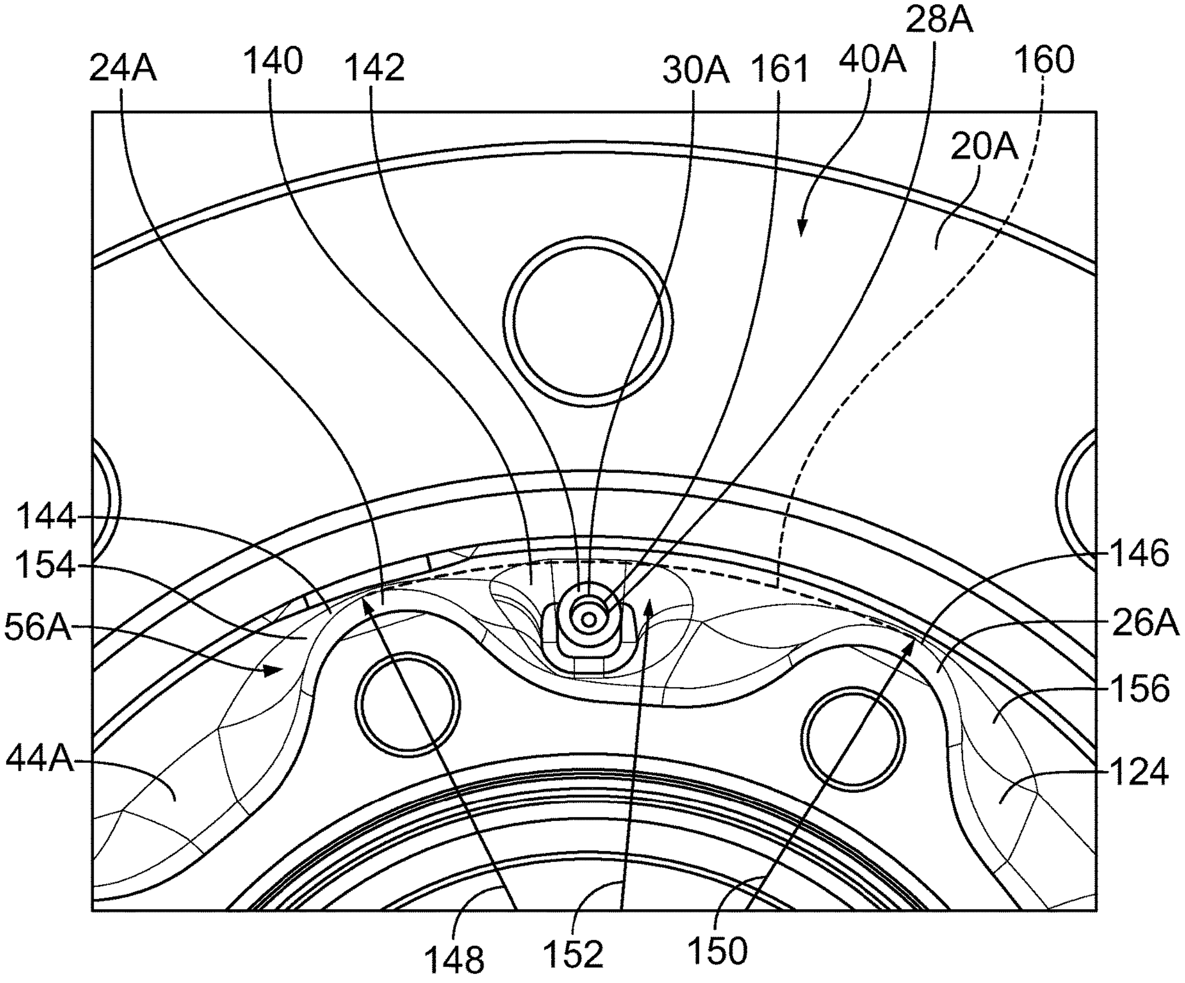
FIG. 4 is an end elevational view of a portion of the wheel hub body of FIG. 3 showing axle stud bosses of the wheel hub body having radially outer surface portions that extend radially outward farther than the position of the exterior port to protect the exterior port from a central flange of a wheel when the wheel is being mounted to or removed from the wheel hub body.

Regarding FIG. 4, the wheel hub body 20A has a pocket 140 formed in the exterior 124 that radially recesses the exterior port 28A from radially outer surface portions 144, 146 of the axle stud bosses 24A, 26A. The exterior port 28A includes an opening 161 and a flat surface 142 extending about the opening 161. The outer surface portions 144, 146 of the axle stud bosses 24A, 26A each have a maximum outer radius 148, 150 taken perpendicularly from the central axis 16. The outer surface portions 144, 146 of the axle stud bosses 24A, 26A are peaks of outer surfaces 154, 156 of the axle stud bosses 24, 26. The outer surface portions 144, 146 are oriented along an arc 160 extending between the axle stud bosses 24A, 26A. The opening 161 has a maximum distance 152 taken perpendicularly to the central axis 16 that is less than the radii 148, 150 such that the opening 161 is radially closer to the central axis 16 than the outer surface portions 144, 146 of the axle stud bosses 24A, 26A. In this manner, the radially inner edge of a center flange of a wheel being mounted to or removed from the wheel hub body 20A will contact the outer surface portions 144, 146 and be supported thereon rather than damaging a component (e.g. a fitting) installed at the exterior port 28.

Figure 5:
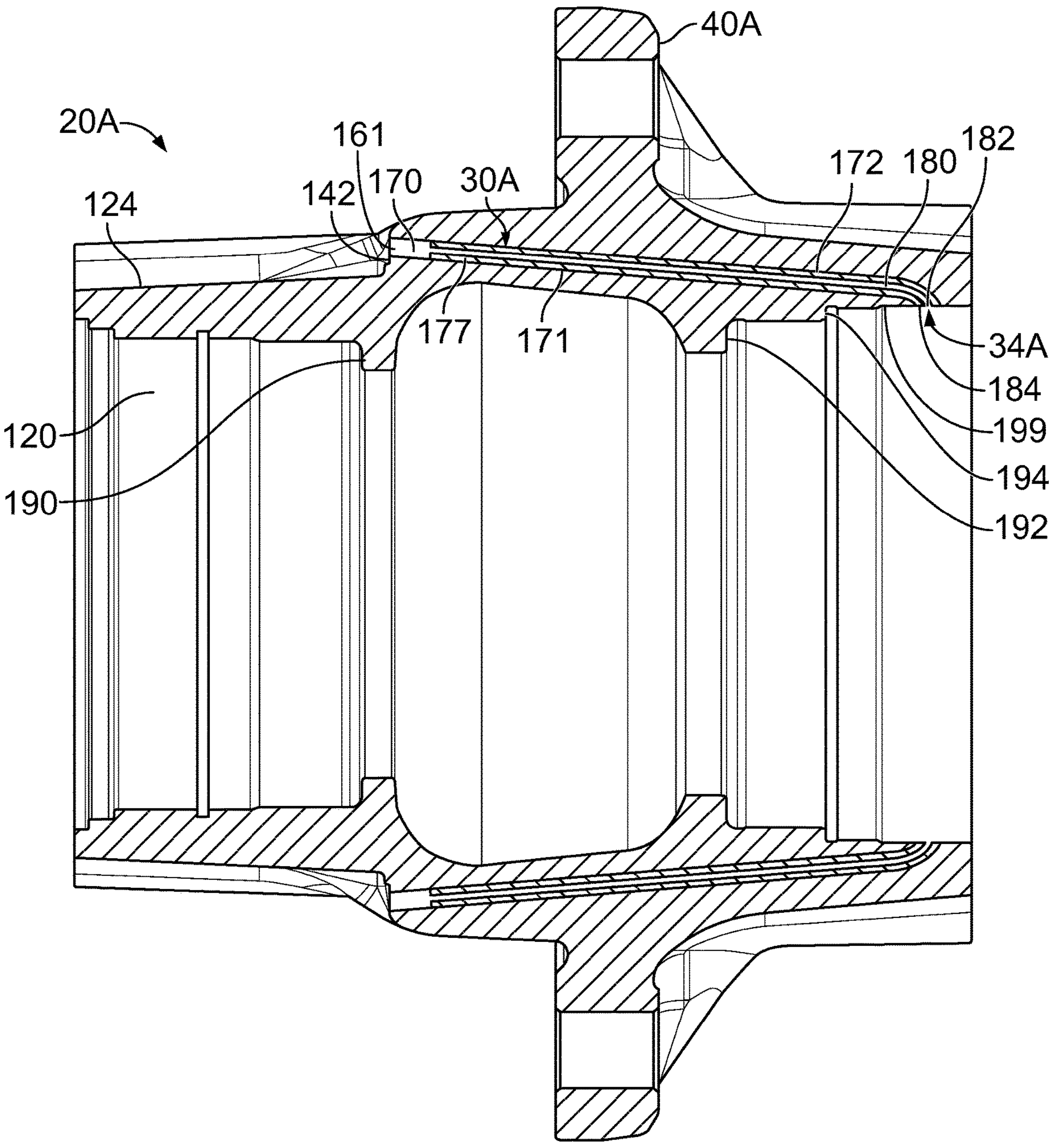
FIG. 5 is a cross-sectional view taken across line 5-5 in FIG. 3 showing passageways extending through a sidewall of the wheel hub body on opposite sides of a central opening of the wheel hub body.

With reference to FIG. 5, the wheel hub body 20A has a through opening surface 170 defining a through opening 171 in the material of the wheel hub body 20A that extends from the interior 120 to the exterior 124 of the wheel hub body 20A. The passage 30A includes a tube 172 in the through opening 171. The tube 172 has an interior 180 that provides a channel for pressurized air to flow between the interior 120 and exterior 124. As discussed in greater detail below, during manufacture of the wheel hub body 20A the tube 172 is cast in the side wall of the wheel hub body 20A. The tube 172 has an end portion 177 that is initially closed during casting to inhibit the flow of molten material into the interior 180 of the tube 172.

In one embodiment, the interior port 34A of the passageway 30A includes an inlet opening 182 of an inlet end portion 184 of the tube 172. As discussed below with respect to FIG. 12, the inlet opening 182 of the tube 170 is formed during machining of the geometry of the interior 120 of the wheel hub body 20A. The machining of the interior 120 includes machining the portions that support with the components of the wheel hub 12, such as outboard and inboard bearing seats 190, 192, a groove 194 to receive a seal case 196 (see FIG. 2) of a lubricant seal 197 associated with the inboard bearing assembly 74, and a seat 199 for the pressurized air distributor 104.

Figure 7:
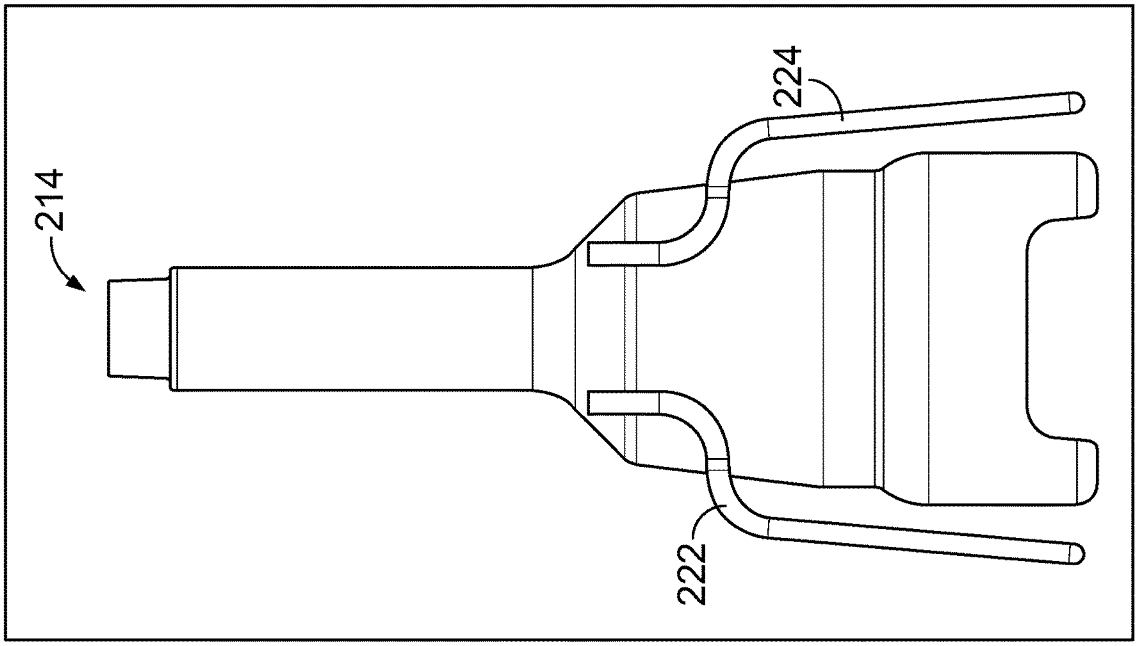
FIG. 7 is a plan view similar to FIG. 6 showing tubes positioned in the grooves of the mold half.
Figure 6:
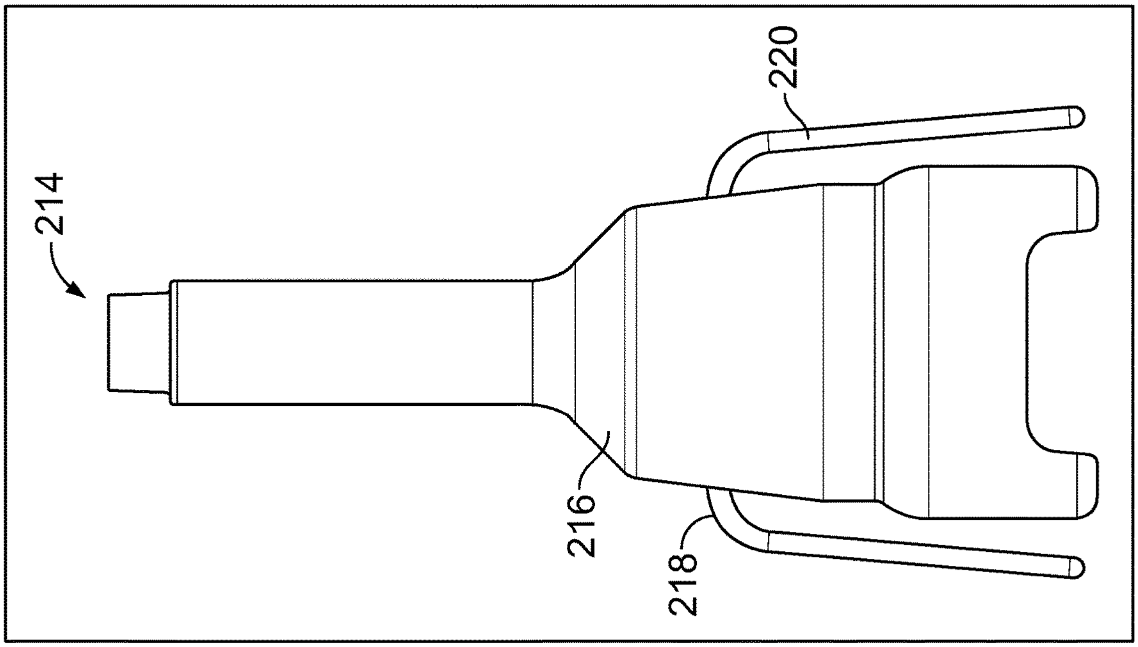
FIG. 6 is a plan view of a mold half of a core box used to form a shell core for casting the wheel hub body of FIG. 5, FIG. 6 showing a cavity to form half of the body of the shell core and grooves for receiving tubes that form passageways in the wheel hub casting.
Figure 8:
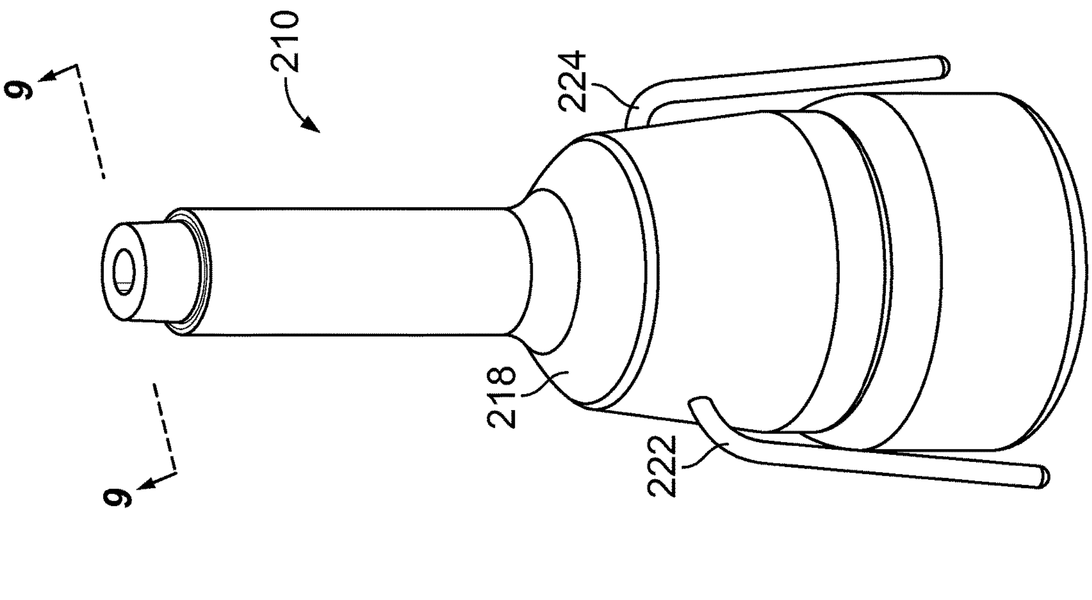
FIG. 8 is a perspective view of a shell core formed using a core box including the mold half of FIGS. 6 and 7, the shell core having a body and tubes extending outward therefrom.

With reference to FIGS. 6-12, a method of manufacturing the wheel hub body 20A is provided. With reference to FIGS. 6 and 8, a core box is initially used to form a shell core 210 made of resin-coated sand. The shell core 210 is positioned in a mold 212 (see FIG. 10) for casting the wheel hub body 20A. The core box includes at least two portions, such as halves, that are brought together and injected with the resin-coated sand and the core box is heated so that the resin-coated sand touching the core box cures to form the shell core 210. In one embodiment, the core box includes a mold half 214 having a cavity 216 to form half of a body 218 (see FIG. 8) of the shell core 210. The mold half 214 is shown empty in FIG. 6 to illustrate grooves 218, 220 for receiving inserts to be cast with the wheel hub body such as tubes 222, 224. The tubes 222, 224 are positioned in the mold half 214 as shown in FIG. 7. A mold half identical to mold half 214 is brought together with the mold half 214 so that the aligned cavities 216 of the mold halves form a completed core box cavity. The resin-coated sand is then injected into the core box cavity and the core box with the resin-coated sand therein is heated to cure the sand.

The mold half 214 is shown in FIG. 6 with two grooves 218, 220 for receiving two tubes 222, 224. The two tubes 222, 224 are shown positioned in the grooves 218, 220 in FIG. 7. The two tubes 222, 224 each form a portion of one of two passageways of the wheel hub. Each of the passageways may be used to provide compressed air to one of two tires of a dual-tire wheel mounted to the wheel hub. In another embodiment, the wheel hub has a single passageway such that the mold half 214 used to form the shell core 210 for the wheel hub has a single groove to receive a single tube. The single passageway may be used to provide compressed air to the one tire of a single-tire wheel mounted to the wheel hub. It will be appreciated that any number of grooves may be formed in the mold half 214 to support a corresponding number of tubes for the resulting sand core.

Figure 9:
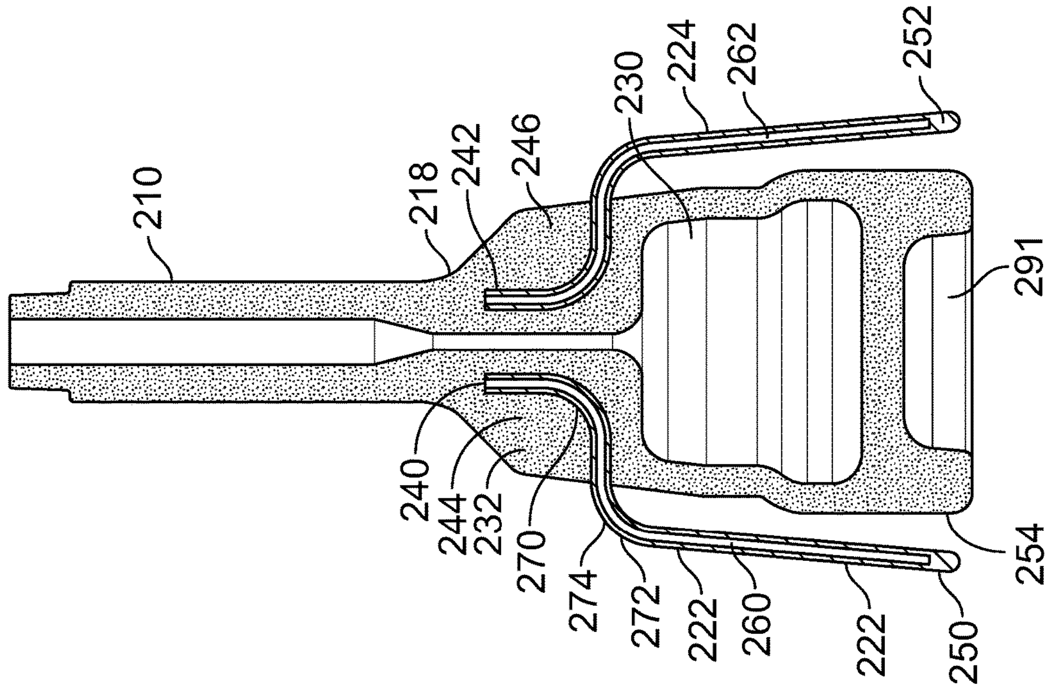
FIG. 9 is a cross-sectional view taken across line 9-9 in FIG. 8 showing upper end portions of the tubes embedded in a wall of the shell core and lower end portions of the tubes spaced radially outward from opposite sides of the shell core.

With reference to FIGS. 8 and 9, the shell core 210 is shown after having been removed from the core box cavity. The shell core 210 is hollow and includes a hollow interior 230 and a sidewall 232 extending thereabout. The tubes 222, 224 have end portions 240, 242 that are embedded in retaining portions 244, 246 of the sidewall 232. The tube end portions 240, 242 may be opened or closed. The tubes 222, 224 have opposite end portions 250, 252 that are spaced radially outward from a radially outer surface 254 of the body 218. The end portions 250, 252 are closed, such as by crimping, to inhibit the flow of molten material into interiors 260, 262 of the tubes 222 224 during the casting operation. The tubes 222, 224 have one or more bends 270, 272 and permit a manufacturer to provide a non-linear passageway between the interior 120 and the exterior 124 of the wheel hub body 20A. The tubes 222, 224 have sidewalls 274 that may be made of steel or aluminum, as some examples.

Figure 10:
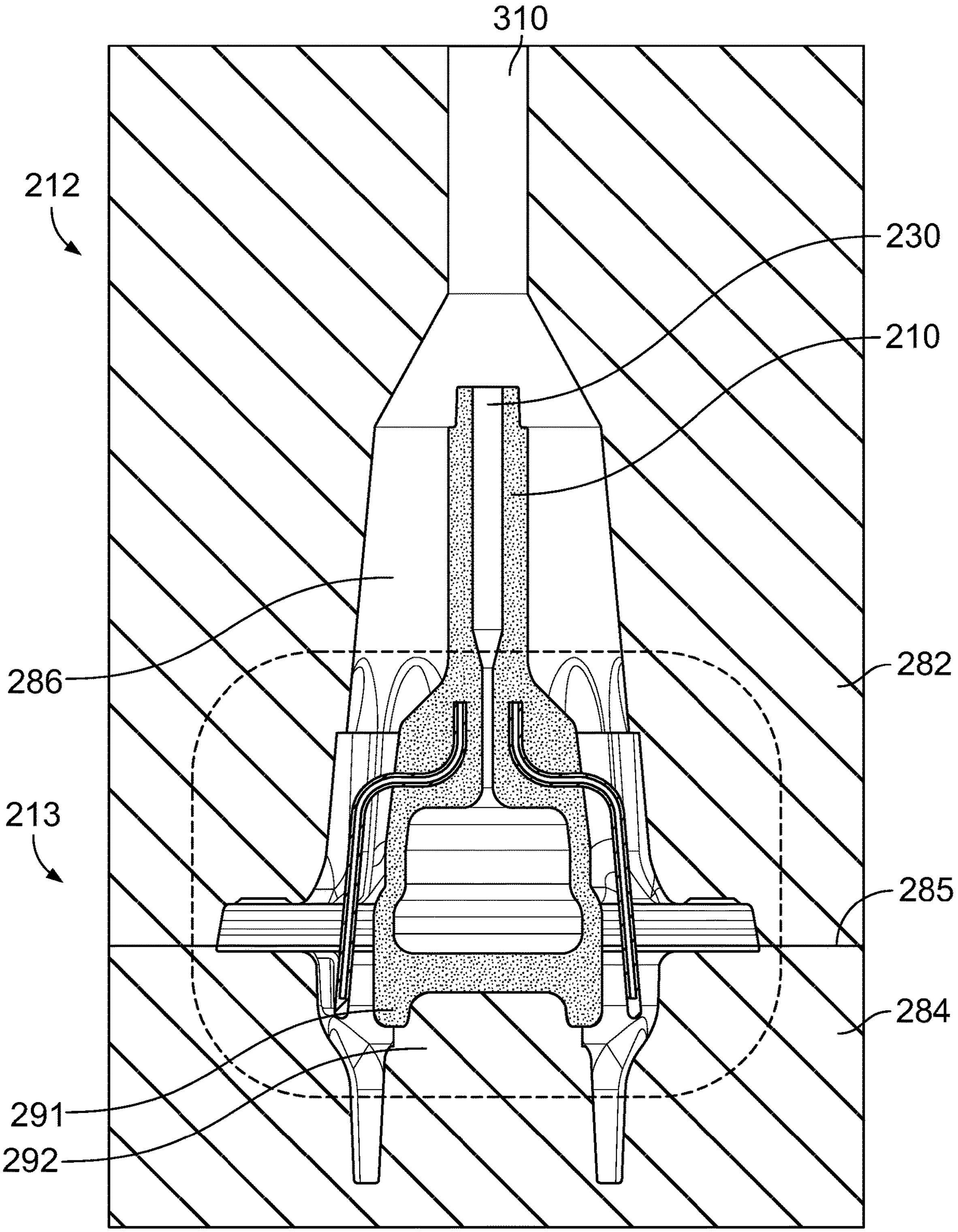
FIG. 10 is a cross-sectional view of the shell core of FIGS. 8 and 9 positioned in a mold for casting the wheel hub body of FIG. 5.
Figure 12:
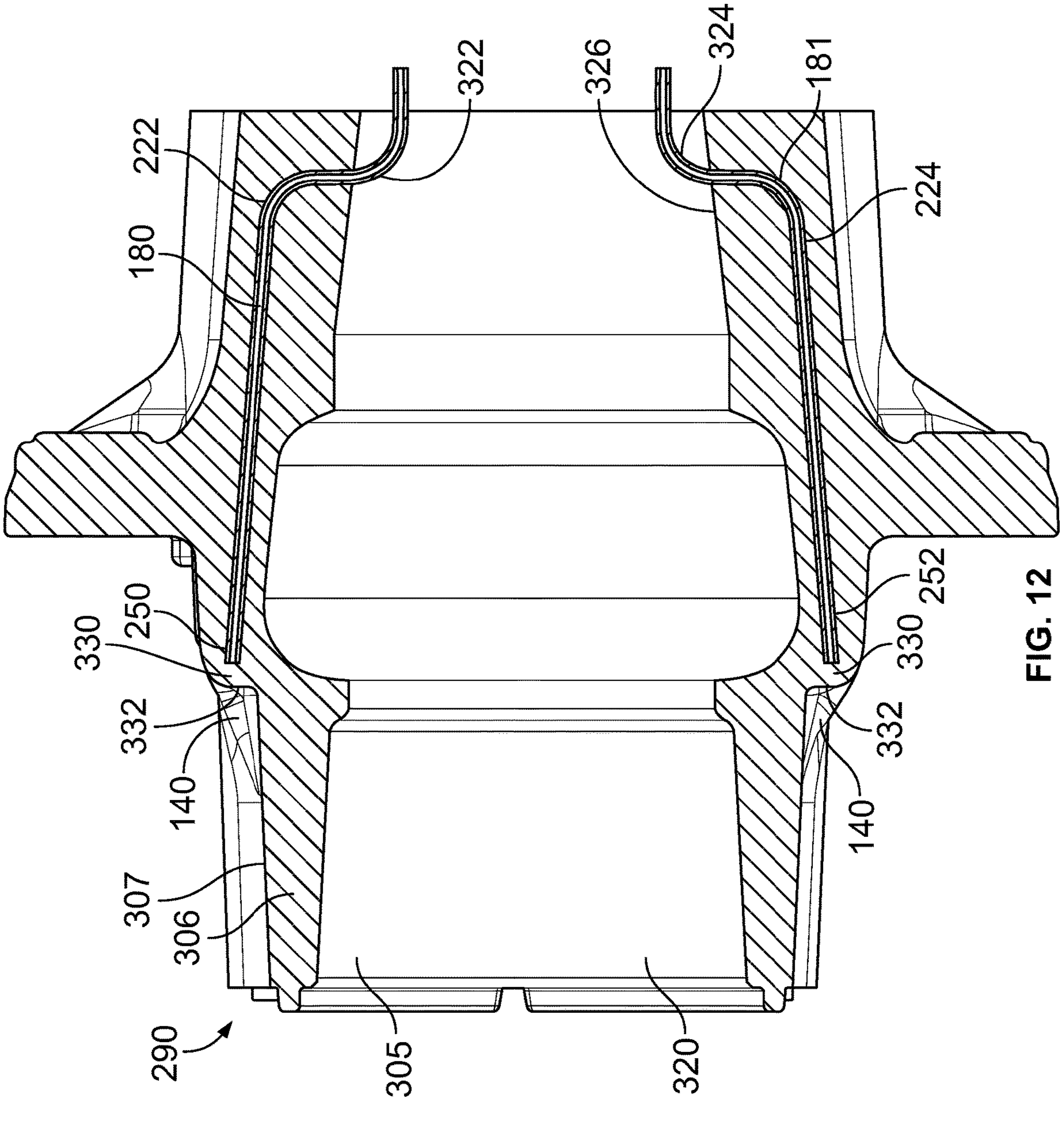
FIG. 12 is a cross-sectional view of a wheel hub casting formed using the mold and shell core of FIG. 10, FIG. 12 showing the wheel hub casting after it has been removed from the mold and portions of the tubes extending radially into a central opening of the wheel hub casting.

Regarding FIG. 10, the mold 212 includes one or more mold portions 213, such as a cope 282 and a drag 284, that define at least a portion of a cavity 286 for forming a wheel hub casting 290 (see FIG. 12). The mold 212 has a mold parting line 285. The mold portions 213 are clamped together to inhibit seepage of molten material out of the cavity 286. The mold 212 has an opening 310 for directing the molten material into the cavity 286.

Figure 11:
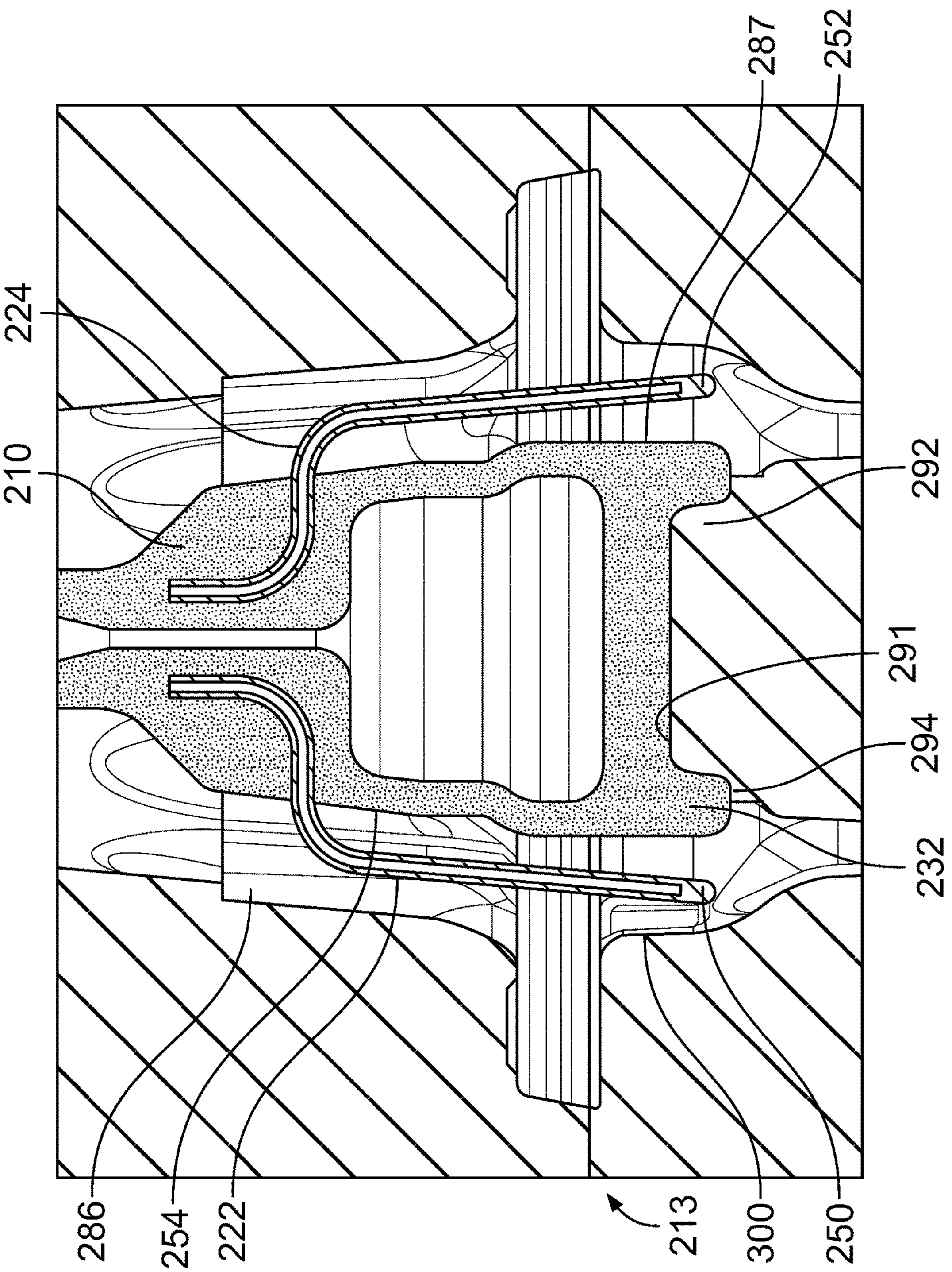
FIG. 11 is an enlarged view of the dashed area in FIG. 10 showing the tubes extending outwardly from the shell core and into a portion of the mold cavity that forms a sidewall of the wheel hub body.

Regarding FIGS. 10 and 11, the shell core 210 is positioned in the cavity 286 with a socket portion 291 of the shell core 210 engaged with a boss 292 of a seat 294 of the mold 212. The tubes 222, 224 project radially outwardly into the mold cavity 286 from an outer surface 287 of the sidewall 232 of the shell core 210. The end portions 250, 252 of the tubes 222, 224 are positioned in a portion of the cavity 286 between a radially inner surface 300 of the mold portions 213 and the radially outer surface 254 of the shell core 210 that is configured to form a sidewall 306 (see FIG. 12) of the casting 290.

To form the casting 290, molten material is directed into the mold cavity 286 about the shell core 210. The molten material may be, for example, aluminum. The molten material is permitted to cool and harden in the cavity 286 to form the casting 290 with the tubes 222, 224 therein about the shell core 210.

Once the casting 290 has hardened, the cope 282 is disconnected from the drag 284. The casting is then removed from the drag 284.

The method of forming the wheel hub body 20A next includes removing the shell core body 218 from the wheel hub casting 290. This may be done, for example, by vibration and/or air blasting to remove the resin-coated sand that forms the body 218 of the shell core 210 from a central opening 320 of the casting 290.

Regarding FIG. 12, once the body 218 of the shell core 210 has been removed from the casting 290, the tubes 222, 224 have portions 322, 324 protruding radially inward from a radially inner surface 326 extending about the central opening 320. Further, the end portions 250, 252 are embedded in the sidewall 306 of the casting 290. The casting 290 has an exterior 307 with pockets 140 formed by corresponding features of the drag 284. The casting 290 has wall portions 330 separating flat surfaces 332 of the pockets 140 from end portions 250, 252 of the tubes 222, 224.

The method of forming the wheel hub 20A includes forming the openings 161 (see FIG. 5) in the flat surfaces 332 of the pockets 140. The forming of the openings 161 opens the end portions 250, 252 of the tubes 222, 224 and places the interiors 260, 262 of the tubes 222, 224 in communication with the openings 161. For example, the openings 161 may be formed by drilling into the flat surfaces 332 and advancing the drill bit until the drill bit removes the crimped material of the tube end portions 250, 252. The flat surfaces 332 make it easier to position the drill bit in the pockets 140 and orient the drill bit along a trajectory that intersects the tube end portions 250, 252.

The method next includes machining the interior 305 of the wheel hub casting 290 to form the internal geometry of the wheel hub body 20A, such as the inboard and outboard bearing seats 190, 192, groove 194, and seat 196 (see FIG. 5). The machining operation also removes portions 322, 324 of the tubes 222, 224 protruding in the central opening 320. The resulting wheel hub body 20A is shown in FIG. 5 after the drilling of the holes 161 and the machining of the interior 305 of the wheel hub casting 290.

Figure 13:
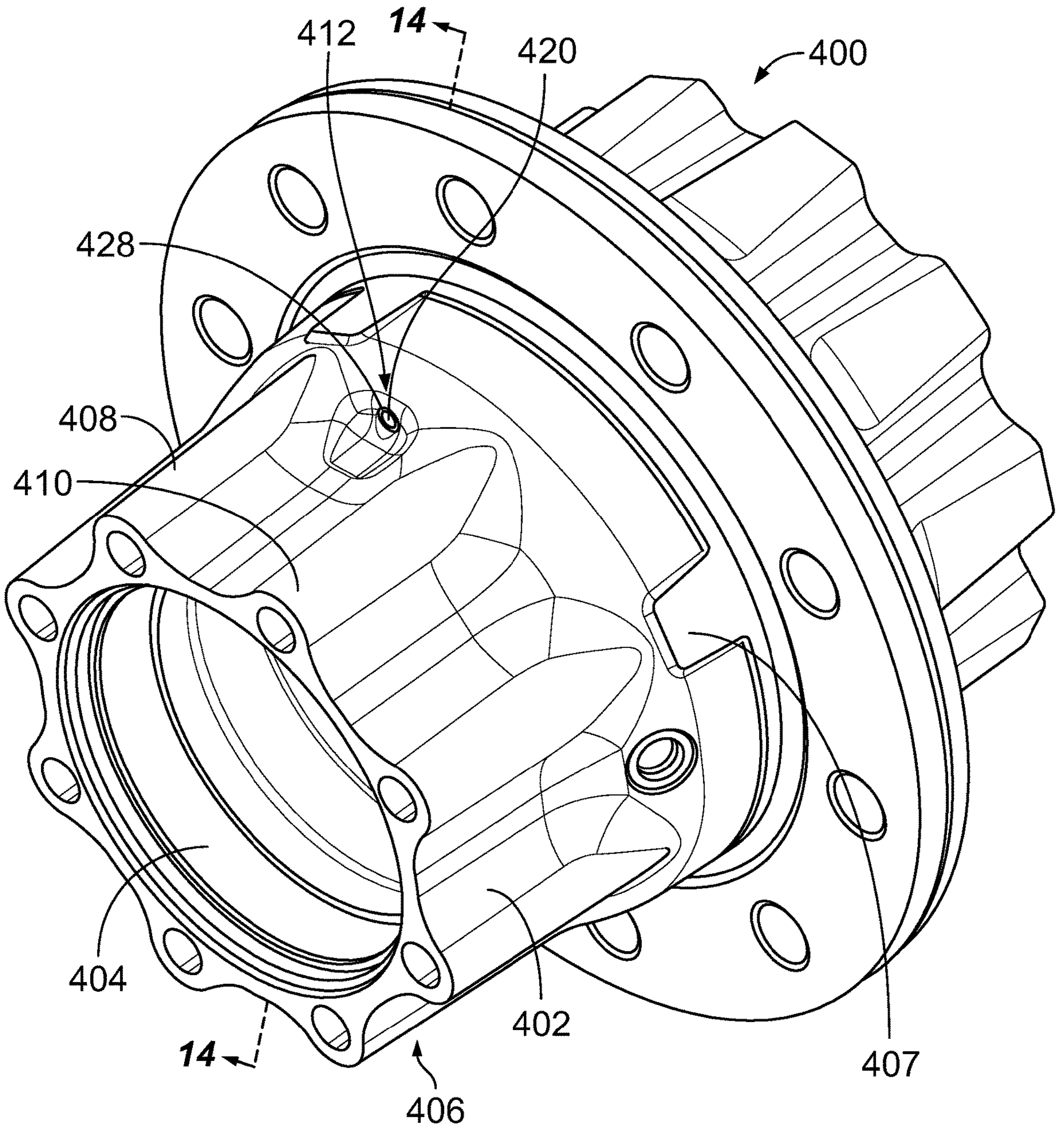
FIG. 13 is a perspective view of another wheel hub having passageways extending between interior and exterior surfaces of the wheel hub.

With reference to FIG. 13, a wheel hub body 400 is provided that is similar in many respects to the wheel hub body 20 discussed above. The wheel hub body 400 includes a sidewall 402 extending about a central opening 404 of the wheel hub body 400. The wheel hub 400 has two passageways 420 that operate as a conduit through the sidewall 402 for compressed air or wiring, as some examples. The wheel hub body 400 has a barrel 406 and a pilot 407 to direct movement of a center flange of a wheel as the wheel is mounted to or removed from the wheel hub body 400. The wheel hub body 400 includes axle stud bosses 408, 410 on either side of an exterior port 412 of the passageway 420 in FIG. 13 to protect the exterior port 412 and components connected thereto from damage by a wheel as the wheel is being mounted to or removed from the wheel hub body 400.

Figure 14:
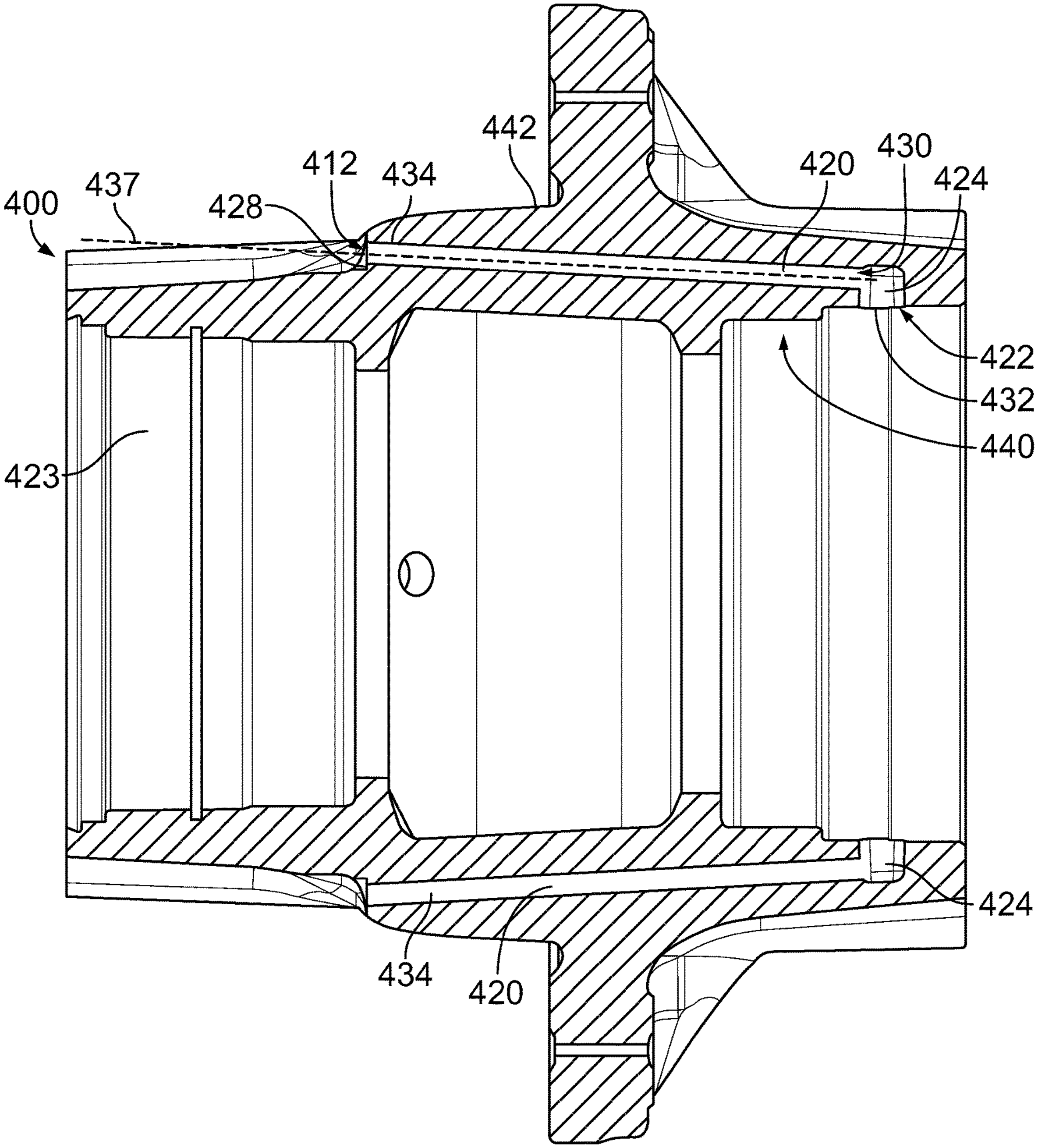
FIG. 14 is a cross-sectional view taken across line 14-14 in FIG. 13 showing an interior portion of each passageway formed during a casting process and an exterior portion of the passageway formed using a drilling operation.
Figure 15:
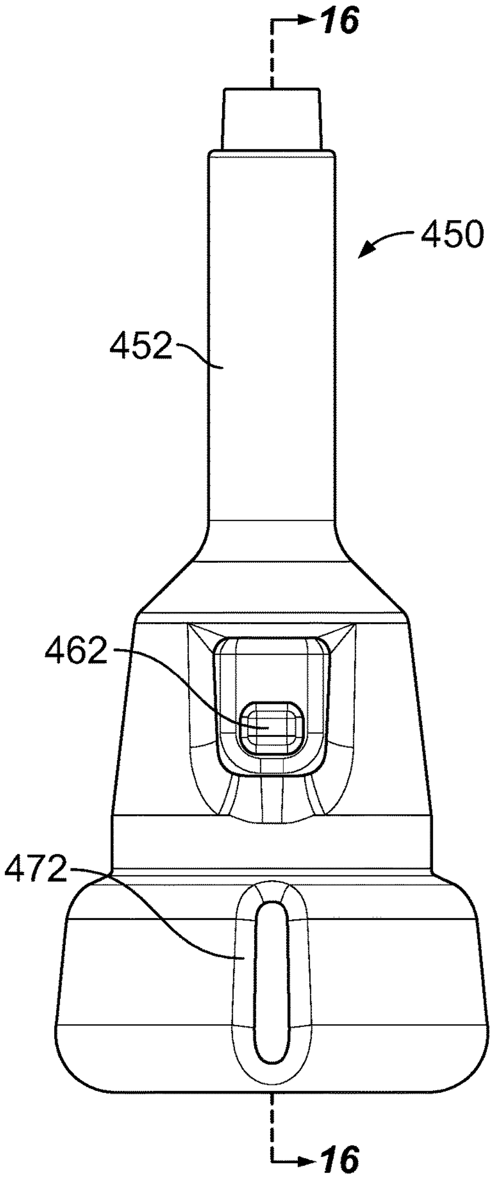
FIG. 15 is an elevational view of a shell core used in a casting process to form the wheel hub body of FIG. 14, FIG. 15 showing an axially aligned protrusion and recess of one side of the shell core.
Figure 16:
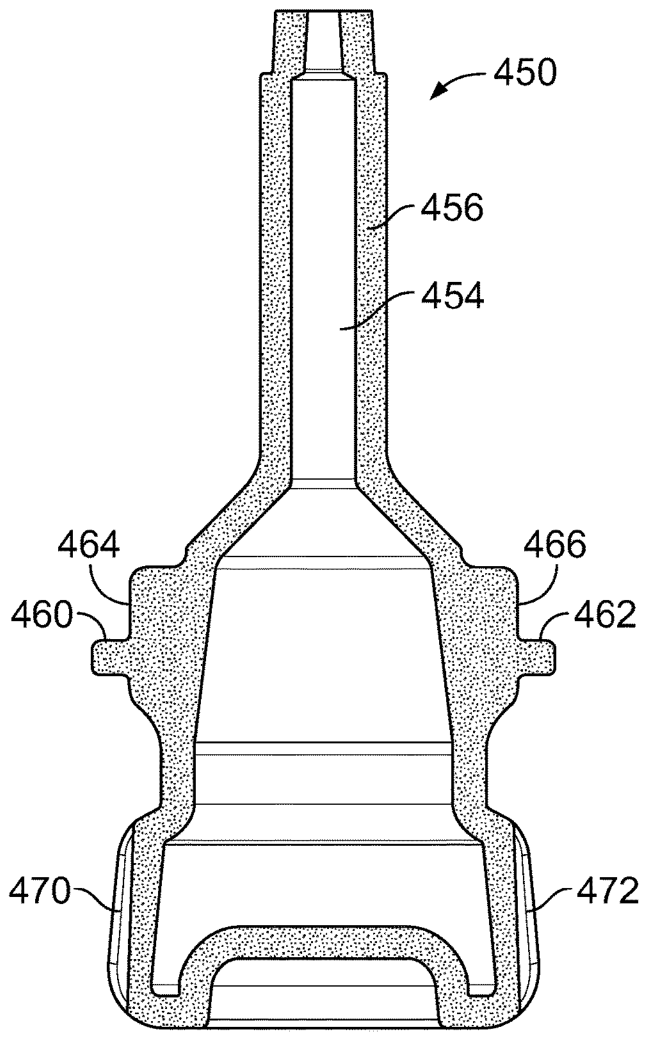
FIG. 16 is a cross-sectional view taken across line 16-16 in FIG. 15 showing protrusions on opposite sides of the shell core that form interior portions of the passageway of the wheel hub during the casting process.

With reference to FIG. 14, the two passageways 420 each have an exterior port 412 and an interior port 422. Each exterior port 412 includes an opening 434 and a flat surface 428 extending thereabout. The opening 434 may be formed by, for example, drilling into the sidewall 402 along an axis 437. Each interior port 422 is formed at an interior surface 423 of the wheel hub body 420. The interior ports 422 have pockets 424 formed by protrusions 460, 462 (see FIG. 16) of a shell core 450 as discussed below. The pockets 424 have openings 432 that open to the interior surface 423.

Each passageway 420 has a juncture 430 between the opening 434 of the exterior port 412 and the pocket 424 of the interior port 422. The juncture 430 between opening 434 and the pocket 424 permits, for example, compressed air to flow from the pocket 424, through the opening 434, and out from the exterior port 412.

With reference to FIGS. 15-19, an example method of manufacturing the wheel hub body 400 is provided. Initially, a shell core 450 is formed using a core box. The shell core 450 is used with a mold 500 (see FIG. 17) to form a casting 484 (see FIG. 19). The casting 484 is machined to form the wheel hub 400.

The shell core 450 includes a body 452 made of cured resin-coated sand and having a hollow interior 454 and a sidewall 456 extending thereabout. The shell core 450 has protrusions 460, 462 extending radially outward from flats 464, 466. The shell core 450 also includes recesses 470, 472 that receive casting material to form radially thicker portions 480 (see FIG. 19) of a sidewall 482 of the casting 484. The additional material of the radially thicker portions 480 allows the openings 434 to be formed in thicker portions 480 of the sidewall 482 (see FIG. 19) of the casting 484 and increases the strength of the wheel hub 400. In one embodiment, the thicker portions 480 includes two diametrically opposed ridges each axially aligned with one of the passageways 420. In another embodiment, the shell core 450 does not includes recesses 470, 472 but instead has an outer diameter sized to form a continuous, annular thicker portion 480 extending around a central opening 486 of the casting 484.

Figure 17:
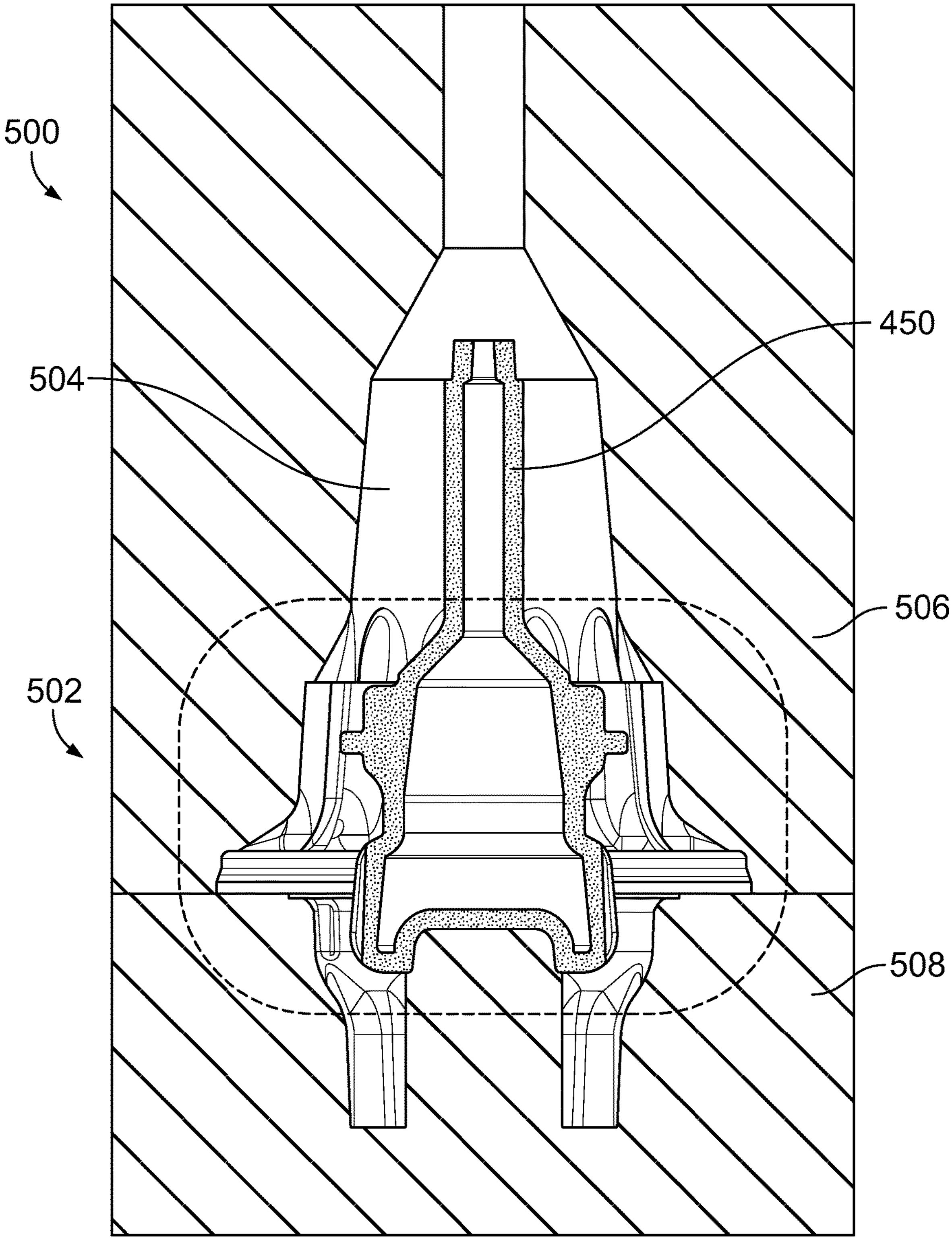
FIG. 17 is a cross-sectional view of a wheel hub body mold assembly with the shell core of FIGS. 15 and 16 positioned in a cavity of the mold assembly.
Figure 18:
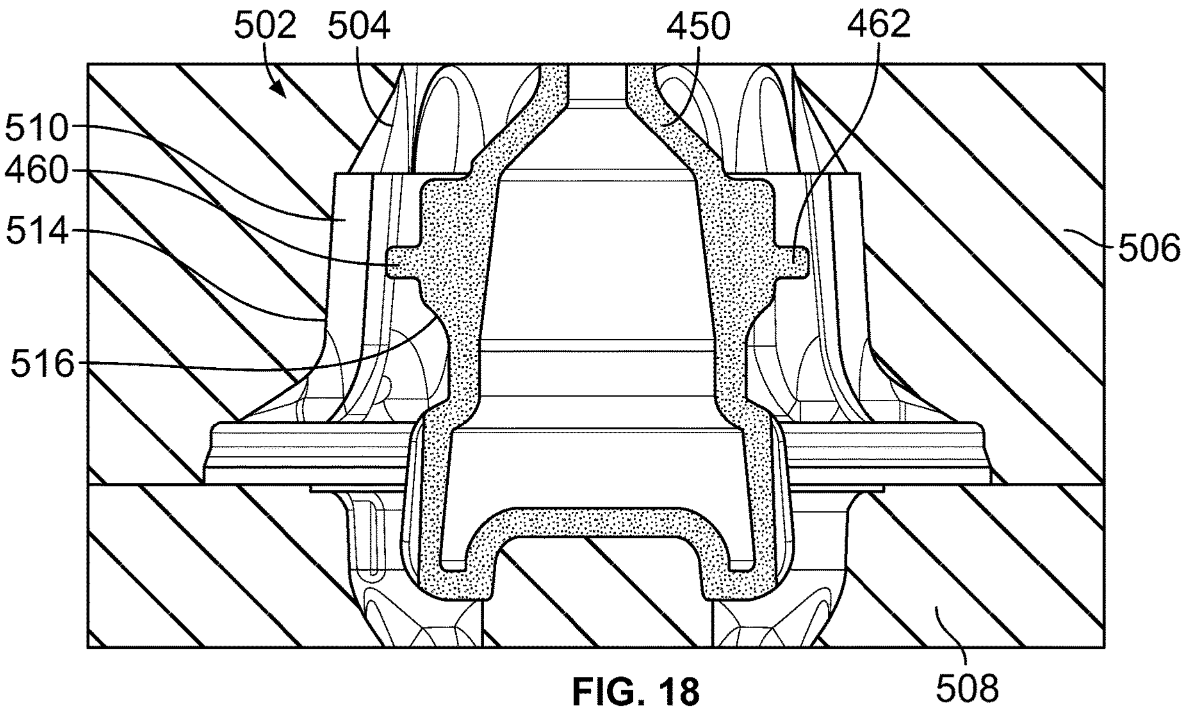
FIG. 18 is an enlarged view of the dashed area of FIG. 17 showing the protrusions extending radially outward into a portion of the cavity that forms a sidewall of the wheel hub body.

With reference to FIGS. 17 and 18, the mold 500 is similar in structure and operation to the mold 312 discussed above. The mold 500 includes mold portions 502 that form a cavity 504 in which the shell core 450 is positioned. The mold portions 502 include a cope 506 and a drag 508. The protrusions 460, 462 of the shell core 450 extend radially outward into a portion 510 of the cavity 504 configured to form the sidewall 482 of the casting 484 between a radially inner surface 514 of the mold portions 502 and a radially outer surface 516 of the shell core 450.

Figure 19:
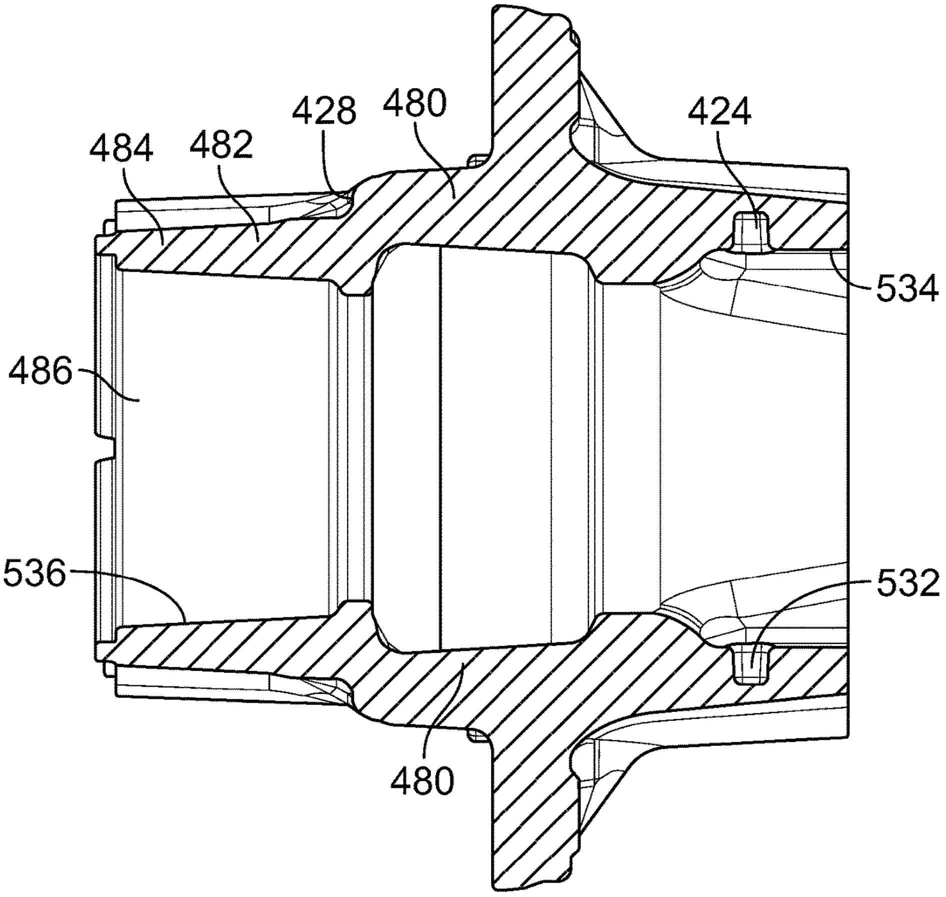
FIG. 19 is a cross-sectional view of a wheel hub casting formed using the wheel hub body mold assembly of FIG. 17, FIG. 19 showing the interior portion of the passageway formed by the shell core after the shell core has been removed from the wheel hub casting.

The method includes directing molten wheel hub material, such as aluminum, into the cavity 504 about the shell core 450. The molten material is permitted to cool and form the wheel hub casting 484. In FIG. 19, the wheel hub casting 484 is shown having been removed from the mold 500 and the shell core 450 removed from the central opening 486 of the wheel hub casting 484 using, for example, vibration and/or air blasting. The casting 484 includes pockets 532, 534 formed by the protrusions 460, 462 of the shell core 450 in a radially inner surface 536 of the casting 484. In one approach, the casting formed using the mold 500 may be longer than the desired length of the wheel hub casting 484, such that the inboard and/or outboard ends of the casting are machined to provide the desired length of the wheel hub casting 484.

The method further includes machining the radially inner surface 536 of the wheel hub casting 484 to accurately define the internal structures of the wheel hub 400, such as the bearing seats, grooves, etc. The machining of the radially inner surface 536 involves machining radially inner portions of the pockets 532, 534 to provide the pockets 424 as shown in FIG. 14. The method further includes drilling or otherwise forming the openings 434 (see FIG. 14) of the passageways 420. The intersection between the openings 434 and the pockets 424 completes the passageways 420.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A wheel hub comprising:

a wheel hub body having an inboard end and an outboard end;

a wheel mounting portion of the wheel hub body intermediate the inboard and outboard ends;

a central opening of the wheel hub body;

an interior surface of the wheel hub body extending about the central opening;

an exterior surface of the wheel hub body opposite the interior surface;

a passageway having an interior port at the interior surface of the wheel hub body, the interior port outboard of the inboard end of the wheel hub body;

an exterior port of the passageway at the exterior surface of the wheel hub body, the exterior port intermediate the wheel mounting portion and the outboard end of the wheel hub body;

wherein the wheel hub body includes an inboard bearing seat outboard of the inboard end of the wheel hub body;

wherein the wheel hub body includes an outboard bearing seat outboard of the inboard bearing seat and inboard of the outboard end of the wheel hub body; and wherein the interior port is inboard of both the inboard bearing seat and the outboard bearing seat.

2. The wheel hub of claim 1 wherein the wheel hub body includes axle stud bosses and recesses therebetween having at least a portion of the exterior surface thereon; and wherein the exterior port is in one of the recesses.

3. The wheel hub of claim 1 wherein the interior port is inboard of the wheel mounting portion.

4. The wheel hub of claim 1 wherein the wheel hub body is rotatable around a central axis; and wherein the exterior port includes an opening and a flat surface portion of the exterior surface extending about the opening; and wherein the flat surface portion of the exterior port extends obliquely to the central axis.

5. The wheel hub of claim 1 wherein the wheel hub body has a unitary, one-piece construction; and wherein the passageway comprises a through opening in the wheel hub body.

6. The wheel hub of claim 1 wherein the passageway comprises a through opening in the wheel hub body and a tube in the through opening.

7. The wheel hub of claim 6 wherein at least one of the interior port and the exterior port includes a portion of the tube.

8. The wheel hub of claim 1 wherein the exterior port includes a flat surface portion of the exterior surface and an opening that opens to the flat surface.

9. The wheel hub of claim 8 wherein the opening comprises a through opening in the wheel hub body;

wherein the passageway includes a tube in the through opening of the wheel hub body; and wherein the tube includes an end portion spaced inboard of the flat surface portion of the exterior port.

10. The wheel hub of claim 1 wherein the wheel hub body includes a protector adjacent the exterior port, the protector configured to inhibit a wheel from contacting the exterior port as the wheel is moved along the wheel hub body.

11. The wheel hub of claim 1 wherein the interior port includes a pocket having an opening that opens to the interior surface;

wherein the passageway includes a straight through bore intersecting the pocket; and wherein the exterior port includes at least a portion of the straight through bore.

12. The wheel hub of claim 1 wherein the mounting portion comprises a flange.

13. The wheel hub of claim 1 further comprising inboard and outboard bearings engaged with the interior surface of the wheel hub body.

14. The wheel hub of claim 1 wherein the passageway comprises a first passageway and a second passageway.

15. The wheel hub of claim 1 wherein the wheel hub body is rotatable around a central axis; and the passageway includes a straight portion extending obliquely to the central axis.

16. The wheel hub of claim 1 further comprising:

a protector of the wheel hub body configured to inhibit a wheel from contacting the exterior port.

17. The wheel hub of claim 16 wherein the protector comprises a protrusion of the wheel hub body adjacent the exterior port so that the wheel contacts the protrusion instead of the exterior port as the wheel is moved along the wheel hub body.

18. The wheel hub of claim 17 wherein the protrusion comprises a pair of protrusions having the exterior port therebetween.

19. The wheel hub of claim 16 wherein the wheel hub body has a central axis of rotation;

wherein the exterior port has a first maximum radial distance from the central axis of rotation; and wherein the protector includes a protector surface portion adjacent the exterior port and having a second maximum radial distance from the central axis of rotation that is greater than the first maximum radial distance so that the protector surface portion is radially outward of the exterior port.

20. The wheel hub of claim 19 wherein the protector surface portion comprises a pair of protector surface portions;

wherein the wheel hub body includes a recess between the protector surface portions; and wherein the exterior port is in the recess.

21. The wheel hub of claim 16 wherein the protector comprises axle stud bosses.

22. The wheel hub of claim 16 wherein the exterior port comprises an opening and an annular surface extending about the opening.

23. The wheel hub of claim 16 wherein the exterior port is inboard of the outboard end of the wheel hub body.

24. The wheel hub of claim 23 wherein the interior port includes a pocket extending radially outward from the interior surface of the wheel hub body.

25. The wheel hub of claim 16 wherein the exterior port includes a recess of the exterior surface.

26. The wheel hub of claim 25 wherein the interior port includes a recess of the interior surface.

27. The wheel hub of claim 16 wherein the passageway includes a through opening in the wheel hub body.

28. The wheel hub of claim 27 wherein the passageway includes a tube in the through opening of the wheel hub body.

* * * * *